(12) United States Patent
Chang

(10) Patent No.: US 8,797,498 B2
(45) Date of Patent: Aug. 5, 2014

(54) LIQUID CRYSTAL OPTICAL LENS AND MANUFACTURING METHOD THEREOF, LENS APPARATUS USING LIQUID CRYSTAL OPTICAL LENS

(75) Inventor: Chi-Lone Chang, Hsinchu County (TW)

(73) Assignee: Silicon Touch Technology Inc., Hsinchu (TW)

( * ) Notice: Subject to any disclaimer, the term of this patent is extended or adjusted under 35 U.S.C. 154(b) by 634 days.

(21) Appl. No.: 12/857,520

(22) Filed: Aug. 16, 2010

(65) Prior Publication Data

US 2011/0069243 A1 Mar. 24, 2011

(30) Foreign Application Priority Data

Sep. 24, 2009 (TW) .............................. 98132336 A

(51) Int. Cl.
*G02F 1/13* (2006.01)
*G02F 1/1333* (2006.01)

(52) U.S. Cl.
USPC .......................................... 349/200; 349/138

(58) Field of Classification Search
USPC ................ 349/13–16, 84–92, 145–146, 200
See application file for complete search history.

(56) References Cited

U.S. PATENT DOCUMENTS

| | | |
|---|---|---|
| 5,867,238 A | 2/1999 | Miller et al. |
| 5,976,405 A | 11/1999 | Clikeman et al. |
| 6,002,383 A | 12/1999 | Shimada |
| 6,211,898 B1 | 4/2001 | Tabuchi |
| 6,452,650 B1 | 9/2002 | Nakao et al. |
| 6,476,887 B1 | 11/2002 | Sekine et al. |
| 6,497,928 B1 | 12/2002 | Sato et al. |
| 6,665,042 B1 | 12/2003 | Marshall et al. |
| 6,815,016 B2 | 11/2004 | Kyu et al. |
| 6,859,333 B1 | 2/2005 | Ren et al. |
| 6,864,931 B1 | 3/2005 | Kumar et al. |

(Continued)

FOREIGN PATENT DOCUMENTS

| | | |
|---|---|---|
| JP | 2001141996 | 5/2001 |
| JP | 2002357804 | 12/2002 |

(Continued)

OTHER PUBLICATIONS

"Office Action of Korea Counterpart Application", issued on Jan. 20, 2012, p. 1-p. 5.

(Continued)

*Primary Examiner* — Bumsuk Won
*Assistant Examiner* — Charles Chang
(74) *Attorney, Agent, or Firm* — Jianq Chyun IP Office

(57) ABSTRACT

A liquid crystal optical lens including a first and a second device substrate and a liquid crystal layer is provided. A first electrode layer and a plurality of first stacked layers are sequent stacked on the first device substrate. Each first stacked layer has a first opening exposing the first electrode layer and includes a first conductive layer and a first insulating layer located between the first conductive layer and the first electrode layer. A second electrode layer and a plurality of second stacked layers are sequent stacked on the second device substrate. Each second stacked layer has a second opening exposing the second electrode layer and including a second conductive layer and a second insulating layer located between the second conductive layer and the second electrode layer. A method for fabricating the liquid crystal optical lens and a lens apparatus using the liquid crystal optical lens are also provided.

12 Claims, 10 Drawing Sheets

(56) References Cited

U.S. PATENT DOCUMENTS

| | | |
|---|---|---|
| 6,897,936 B1 | 5/2005 | Li et al. |
| 6,898,021 B1 | 5/2005 | Tang |
| 7,029,728 B2 | 4/2006 | Dunn et al. |
| 7,034,907 B2 | 4/2006 | West et al. |
| 7,038,743 B2 | 5/2006 | Komitov et al. |
| 7,038,754 B2 | 5/2006 | Hirakata et al. |
| 7,042,549 B1 | 5/2006 | Ren et al. |
| 7,079,203 B1 | 7/2006 | Huang et al. |
| 7,102,706 B2 | 9/2006 | Kim et al. |
| 2005/0073739 A1* | 4/2005 | Meredith et al. .............. 359/319 |
| 2005/0207290 A1* | 9/2005 | Iwasaki et al. ............. 369/44.23 |
| 2005/0231677 A1* | 10/2005 | Meredith ...................... 349/143 |
| 2006/0273284 A1* | 12/2006 | Hirose ..................... 252/299.61 |
| 2008/0151168 A1* | 6/2008 | Sekiguchi ..................... 349/142 |
| 2009/0153754 A1* | 6/2009 | Jung ............................... 349/15 |
| 2009/0219475 A1* | 9/2009 | Tseng et al. .................. 349/123 |

FOREIGN PATENT DOCUMENTS

| | | |
|---|---|---|
| JP | 2004219569 | 8/2004 |
| JP | 2007017510 | 1/2007 |
| JP | 2007065151 | 3/2007 |

OTHER PUBLICATIONS

"Office Action of Japan Counterpart Application", issued on Sep. 25, 2012, p. 1-p. 2.

"Seond Office Action of China Counterpart Application", issued on Jan. 7, 2013, p. 1-p. 7.

* cited by examiner

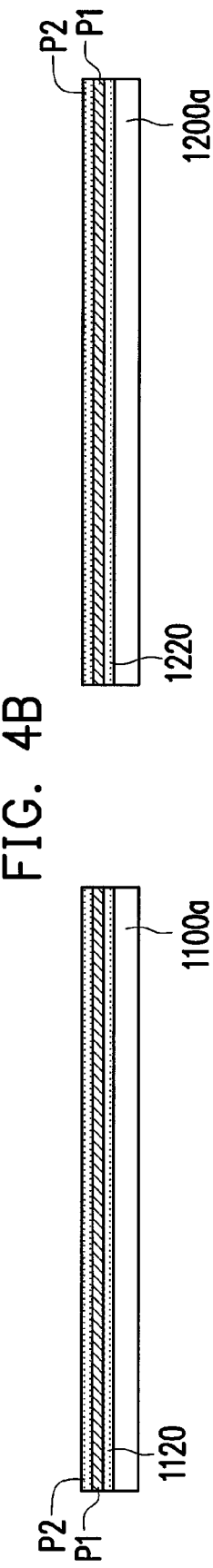

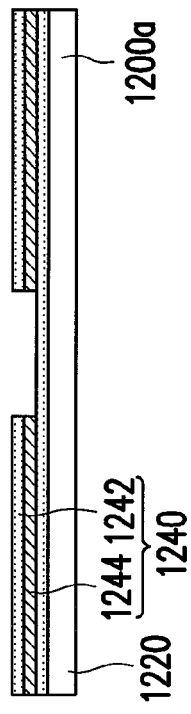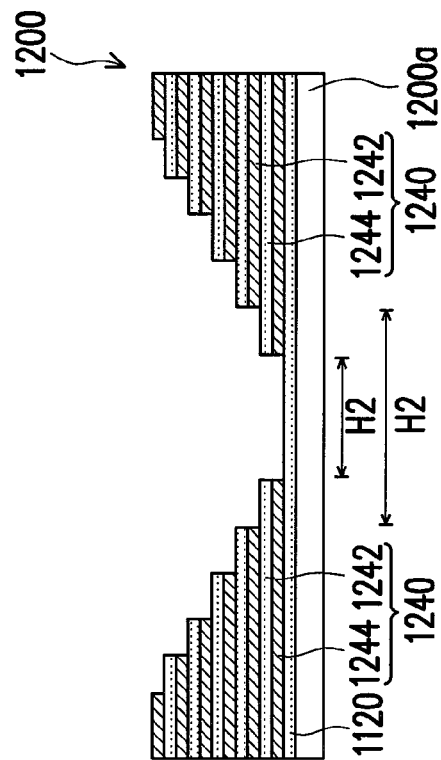
FIG. 4D
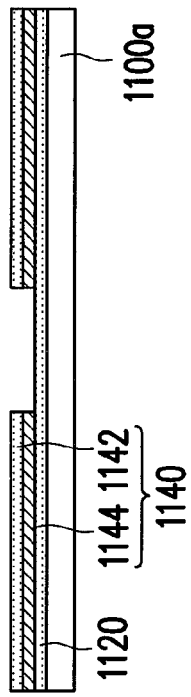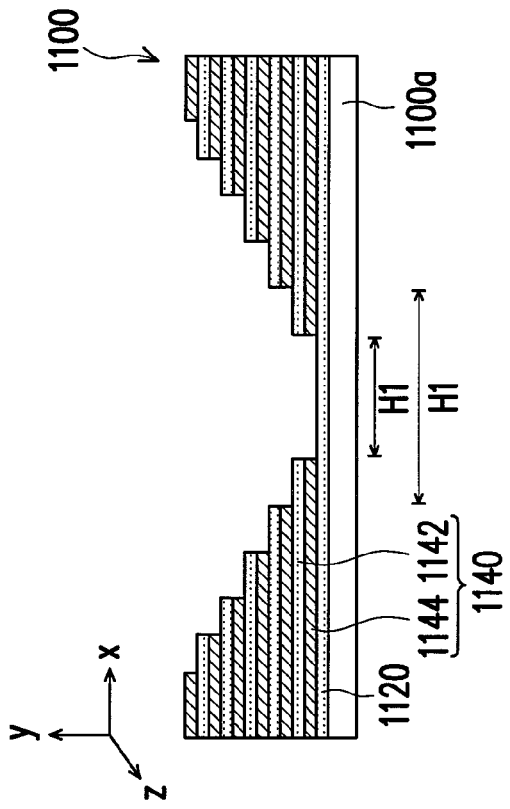
FIG. 4E

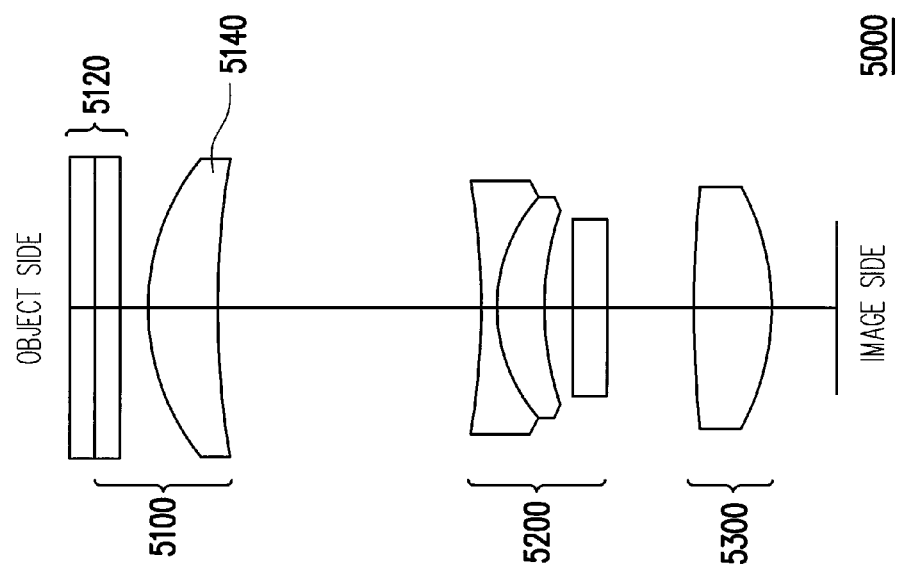

LIQUID CRYSTAL OPTICAL LENS AND MANUFACTURING METHOD THEREOF, LENS APPARATUS USING LIQUID CRYSTAL OPTICAL LENS

CROSS-REFERENCE TO RELATED APPLICATION

This application claims the priority benefit of Taiwan application serial no. 98132336, filed on Sep. 24, 2009. The entirety of the above-mentioned patent application is hereby incorporated by reference herein and made a part of specification.

BACKGROUND OF THE INVENTION

1. Field of the Invention

The invention generally relates to an optical lens and a manufacturing method thereof, and more particularly to a liquid crystal optical lens with adjustable refractive power and a manufacturing method thereof, and to a lens apparatus using the liquid crystal optical lens.

2. Description of Related Art

In a common lens system, in a lens apparatus which has an optical zoom function, each of the lens groups located inside the lens apparatus must generate corresponding movements to accommodate changes in a zoom ratio. In a conventional mechanical design of a miniature optical zoom lens, the mechanical design usually requires at least two driving apparatuses. That is, at least two step motors, ultrasonic motors, piezoelectric actuators, and the like are required as the driving source. However, implementing the zoom lens in this manner results in a bulky yet complicated structure, in contrast to a goal of product miniaturization and portability. Moreover, the relative movements of each lens group requires a position sensor and a close-loop controller to implement, which goes against a requirement of consumer products in simplicity and low price.

Moreover, besides using high cost precision driving devices as the motor sources (e.g., stepping motors, ultrasonic motors, piezoelectric actuators) of the lens groups, the focus and zoom structures used in a common lens apparatus further employ a plurality of micro gears, cam wheels, turbines, and the like transmission devices. Therefore, not only are the structural framework more complicated, the assembly steps made more difficult and numerous, the size more bulky and the cost more expensive, but power consumption has also exponentially increased.

Consequently, in order to alleviate the aforementioned issues, an adjustable zoom liquid crystal lens that decreases structural complexity and minimizes bulk for the above-described lens apparatus has become increasingly important. Hereinafter, various related research proposals are described.

In U.S. Pat. No. 7,079,203, the disclosure proposes using a polymer network liquid crystal (PNLC) method to achieve the optical functions of the lenses. However, since the optical functions are not achieved with a single apparatus/module, consumer application is limited due to implementation difficulties.

Moreover, in U.S. Pat. No. 7,042,549, the disclosure proposes using a polymer dispersed liquid crystal (PDLC) method to provide lens functions using liquid crystal droplets. However, the disclosure does not describe a lens scaling module.

In U.S. Pat. No. 7,102,706, the disclosure proposes a method of grouping liquid crystal molecules in a PNLC. Similarly, however, since the optical functions are not achieved with a single apparatus/module, consumer usage is not possible due to implementation difficulties.

Moreover, in U.S. Pat. No. 6,898,021, the disclosure proposes a single tunable LC lens structure, but does not propose using a PNCL type lens function. In addition, the proposed optical system is not a multi-stage liquid crystal lens structure.

In U.S. Pat. No. 6,859,333, the disclosure proposes an apparatus utilizing electric field variations to change the light paths in a liquid crystal lens. However, since the proposed apparatus does not have a module structure, consumer application is still limited due to implementation difficulties.

Similarly, in U.S. Pat. Nos. 5,867,238, 5,976,405, 6,002,383, 6,211,898, 6,452,650, 6,476,887, 6,497,928, 6,665,042, 6,815,016, 6,864,931, 6,897,936, 7,029,728, 7,034,907, 7,038,743 and 7,038,754, the disclosures proposed various methods of using liquid crystal lens, and more specifically, structures including a PNLC mixture and a stop. However, these disclosures do not describe a scaling device or a module structure.

SUMMARY OF THE INVENTION

An aspect of the invention provides a liquid crystal optical lens which changes a refractive power thereof by electrically controlling and adjusting an internal refractive index distribution therein.

An aspect of the invention provides a manufacturing method of a liquid crystal optical lens which can manufacture the above-described liquid crystal optical lens.

An aspect of the invention provides a lens apparatus which uses the aforementioned liquid crystal optical lens, and the lens apparatus has a preferred optical performance.

An aspect of the invention provides a liquid crystal optical lens including a first device substrate, a second device substrate, and a liquid crystal layer. The first device substrate includes a first electrode layer and a plurality of first stacked layers stacked in sequence thereon. Each of the first stacked layers has a first opening to expose the first electrode layer, and each of the first stacked layers includes a first conductive layer and a first insulating layer disposed between the first conductive layer and the first electrode layer. The second device substrate includes a second electrode layer and a plurality of second stacked layers stacked in sequence thereon. In addition, the second device substrate is arranged opposite the first device substrate. Each of the second stacked layers has a second opening to expose the second electrode layer, and each of the second stacked layers includes a second conductive layer and a second insulating layer disposed between the second conductive layer and the second electrode layer. The liquid crystal layer is disposed between the first device substrate and the second device substrate, and the liquid crystal layer is configured in the first opening and the second opening.

In one embodiment of the invention, a width of the first opening of each of the first stacked layers increases in a direction away from the first device substrate, and a width of the second opening of each of the second layers increases in a direction away from the second device substrate.

In one embodiment of the invention, the first openings of the first stacked layers respectively correspond to the second openings of the second stacked layers.

In one embodiment of the invention, the first openings of the first stacked layers and the second openings of the second stacked layers are a circular opening.

In one embodiment of the invention, the liquid crystal optical lens further includes a first alignment layer and a second alignment layer. The first alignment layer has a first alignment direction, and the first alignment layer is disposed on the first device substrate to cover the first electrode layer and the first conductive layer of each of the first stacked layers. The second alignment layer has a second alignment direction, and the second alignment layer is disposed on the second device substrate to cover the second electrode layer and the second conductive layer of each of the second stacked layers. In one embodiment of the invention, the first alignment direction is substantially perpendicular to the second alignment direction.

In one embodiment of the invention, the liquid crystal optical lens further includes a sealant disposed between the first alignment layer and the second alignment layer, so as to seal the first device substrate with the second device substrate.

In one embodiment of the invention, the first electrode layer and the first conductive layer of each of the first stacked layers are electrically connected to a first potential, and the second electrode layer and the second conductive layer of each of the second stacked layers are electrically connected to a second potential. The first potential is different from the second potential.

In one embodiment of the invention, the first electrode layer and the second electrode layer are driven by a first driving signal source, and the first conductive layer of each of the first stacked and the second conductive layer of each of the second stacked layers corresponding thereto are driven by a second driving signal source.

In one embodiment of the invention, a material of the liquid crystal layer includes polymer network liquid crystal (PNLC).

In one embodiment of the invention, the first stacked layers or the second stacked layers further include a trench connecting the first opening or the second opening, so as to transfer the material of the liquid crystal layer to the first opening or the second opening by the trench.

In one embodiment of the invention, a material of the first electrode layer, the first conductive layer, the second electrode layer, and the second conductive layer is a transparent conductive material.

An aspect of the invention provides a manufacturing method of a liquid crystal optical lens, including the steps described hereinafter. First, a first substrate and a second substrate are provided. Thereafter, a first electrode layer and a plurality of first stacked layers are stacked on the first substrate in sequence to form a first device substrate, in which each of the first stacked layers has a first opening exposing the first electrode layer, and each of the first stacked layers includes a first conductive layer and a first insulating layer disposed between the first conductive layer and the first electrode layer. Thereafter, a second electrode layer and a plurality of second stacked layers are stacked on the second substrate in sequence to form a second device substrate, in which each of the second stacked layers has a second opening exposing the second electrode layer, and each of the second stacked layers includes a second conductive layer and a second insulating layer disposed between the second conductive layer and the second electrode layer. Thereafter, the first device substrate is assembled with the second device substrate, and a liquid crystal material is injected between the first device substrate and the second device substrate to form a liquid crystal layer.

In one embodiment of the invention, stacking the first electrode layer and the first stacked layers on the first substrate in sequence to form the first device substrate includes the steps described hereinafter. First, a step (a) is performed, in which the first electrode layer is formed on the first substrate. Thereafter, a step (b) is performed, in which an insulating material layer and a conductive material layer are formed on the first electrode layer in sequence. Thereafter, a step (c) is performed, in which the insulating material layer and the conductive material layer are patterned, so as to form the first stacking layers having the first insulating layer and the first conductive layer. Thereafter, steps (b) and (c) are repeatedly performed so as to stack a plurality of first stacked layers on the first electrode layer, in which the first opening of each of the first stacked layers increases in a direction away from the first substrate.

In one embodiment of the invention, stacking the second electrode layer and the second stacked layers on the second substrate in sequence to form the second device substrate includes the steps described hereinafter. First, a step (a) is performed, in which a second electrode layer is formed on a second substrate. Thereafter, a step (b) is performed, in which an insulating material layer and a conductive material layer are formed on the second electrode layer in sequence. Thereafter, a step (c) is performed, in which the insulating material layer and the conductive material layer are patterned, so as to form the second stacking layers having the second insulating layer and the second conductive layer. Thereafter, steps (b) and (c) are repeatedly performed so as to stack a plurality of second stacked layers on the second electrode layer, in which the second opening of each of the second stacked layers increases in a direction away from the second substrate.

In one embodiment of the invention, the above-described manufacturing method of the liquid crystal optical lens further includes the steps described hereinafter. First, a first alignment layer is formed on the first device substrate to cover the first electrode layer and the first conductive layer of each of the first stacked layers, in which the first alignment layer has a first alignment direction. Thereafter, a second alignment layer is formed on the second device substrate to cover the second electrode layer and the second conductive layer of each of the second stacked layers, in which the second alignment layer has a second alignment direction, and the second alignment direction is different from the first alignment direction.

In one embodiment of the invention, the above-described manufacturing method of the liquid crystal optical lens further includes the steps described hereinafter. A trench is formed on the first stacked layers or the second stacked layers to connect the first opening or the second opening, and to transfer the material of the liquid crystal layer to the first opening or the second opening by the trench.

An aspect of the invention provides a lens apparatus including a first lens group, a second lens group, and a third lens group. The first lens group has a positive refractive power, and the first lens group is composed of a liquid crystal optical lens and a compensator lens arranged in sequence from an object side to an image side. The second lens group is disposed between the first lens group and the image side, and the second lens group has a negative refractive power. The third lens group is disposed between the second lens group and the image side, and the third lens group has a positive refractive power. A location of the first lens group and the third lens group is fixed with respect to the lens apparatus, and the second lens group moves in a plurality of segmented and fixed distances between the first lens group and the third lens group.

In one embodiment of the invention, the second lens group is a zoom lens group, and the third lens group is a compensator lens group.

In one embodiment of the invention, the lens apparatus further includes a refractor disposed between the object side and the first lens group, in which an object light from the object side is refracted by the refractor and transmitted to the first lens group.

In one embodiment of the invention, the liquid crystal optical lens includes a first device substrate, a second device substrate, and a liquid crystal layer. A first device substrate includes a first electrode layer and a plurality of first stacked layers stacked in sequence thereon. Each of the first stacked layers has a first opening to expose the first electrode layer, and each of the first stacked layers includes a first conductive layer and a first insulating layer disposed between the first conductive layer and the first electrode layer. The second device substrate includes a second electrode layer and a plurality of second stacked layers stacked in sequence thereon. In addition, the second device substrate is arranged opposite the first device substrate. Each of the second stacked layers has a second opening to expose the second electrode layer, and each of the second stacked layers includes a second conductive layer and a second insulating layer disposed between the second conductive layer and the second electrode layer. The liquid crystal layer is disposed between the first device substrate and the second device substrate, and the liquid crystal layer is configured in the first opening and the second opening.

In summary, the electrode layers and conductive layers of the liquid crystal optical lens according to an embodiment of the invention mainly adopts a three-dimensional stacking design, and the adopted shape of the conductive layers is a ring shape. Therefore, when respectively applying a suitable voltage to each of the electrodes, a light focus/diverge function similar to a convex/concave lens can be obtained. That is, a gradient-index lens (GRIN) lens having a preferred focus function is formed. Moreover, an embodiment of the invention provides a manufacturing method of the above-described liquid crystal optical lens. In addition, the lens apparatus according to an embodiment of the invention adopts the above-described liquid crystal optical lens. Not only does the lens apparatus have a preferred focus function, but the lens apparatus can also lower the complexity of the entire structure as well as the cost.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 4A-4F are schematic diagrams illustrating a process for manufacturing a liquid crystal optical lens in accordance with an embodiment of the invention.

FIG. 5 is a schematic diagram illustrating a lens apparatus in accordance with another embodiment of the invention.

DESCRIPTION OF EMBODIMENTS

Figure 1:
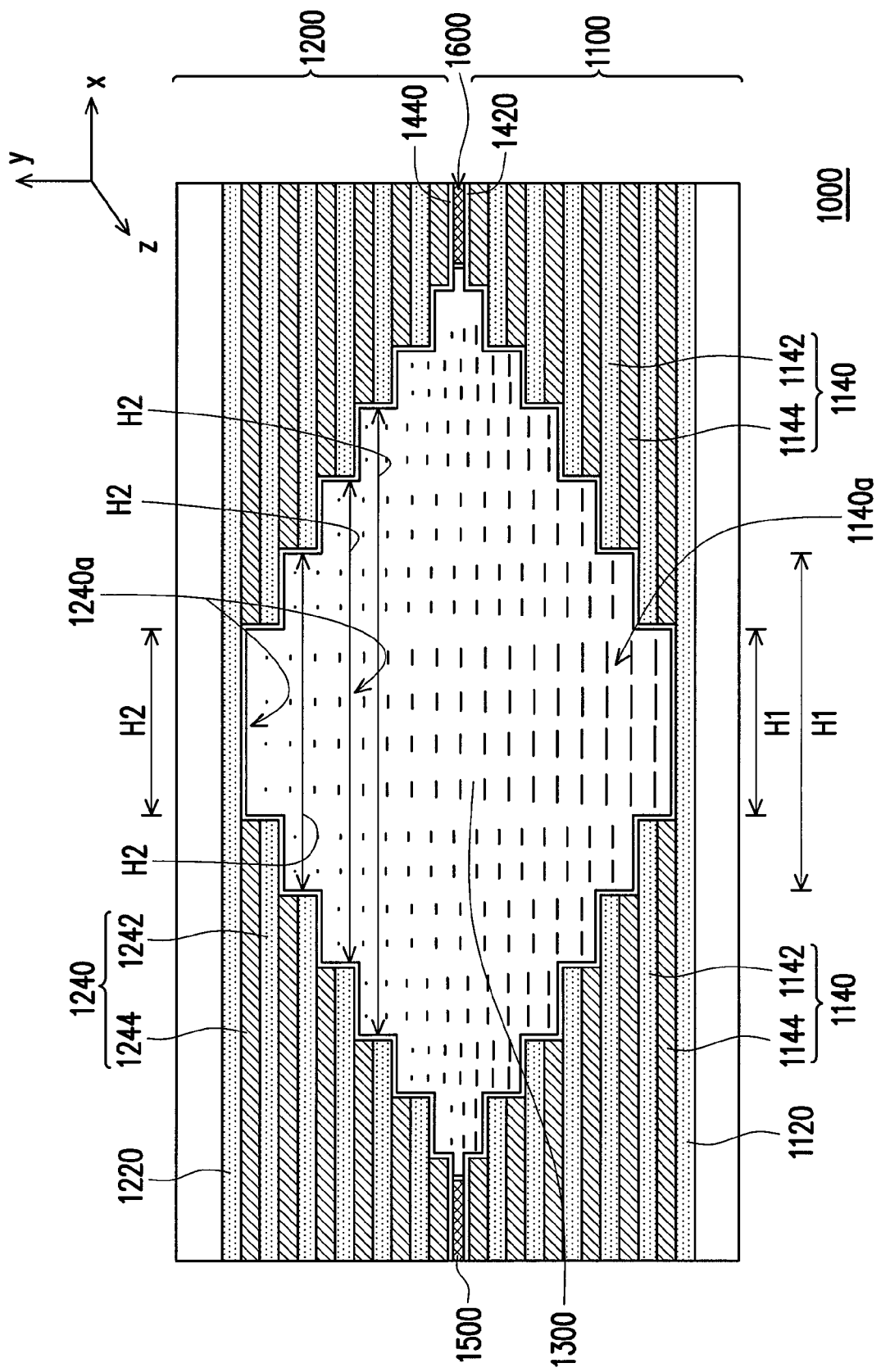
FIG. 1 is a schematic cross-sectional diagram of a liquid crystal optical lens in accordance with an embodiment of the invention.
Figure 2A:
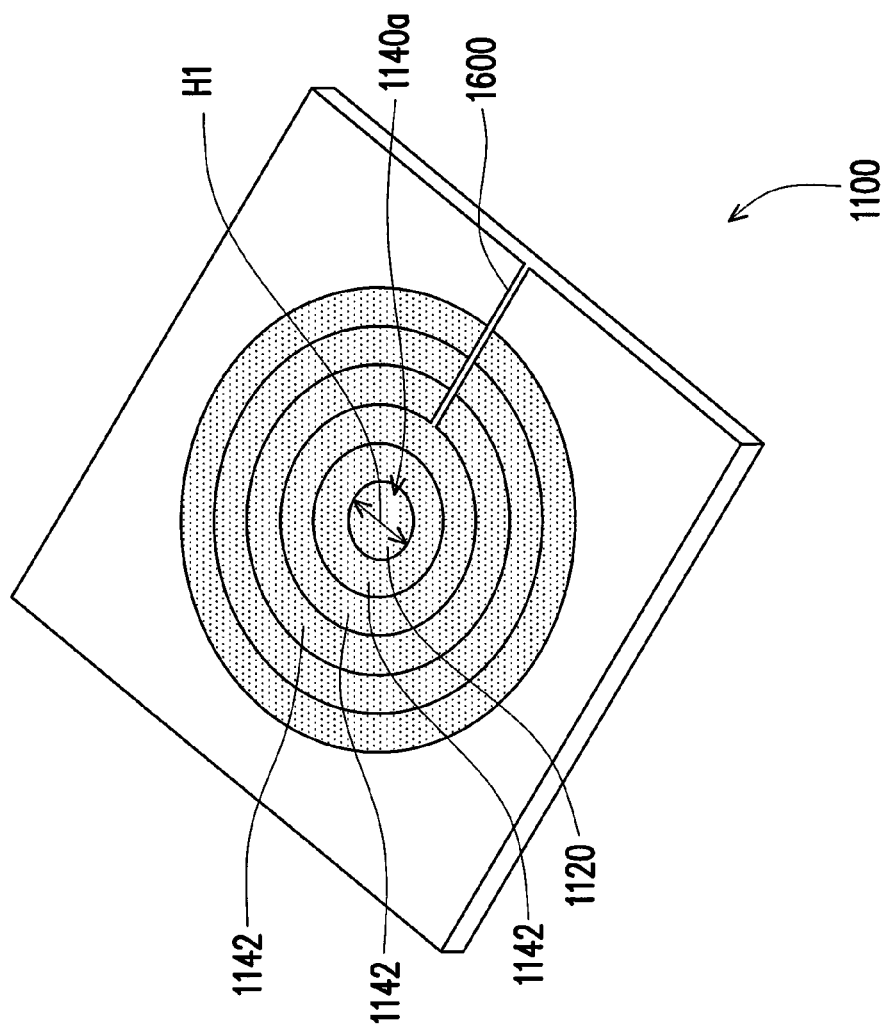
FIGS. 2A and 2B are schematic diagrams respectively illustrating a first device substrate and a second device substrate depicted in FIG. 1.
Figure 2B:
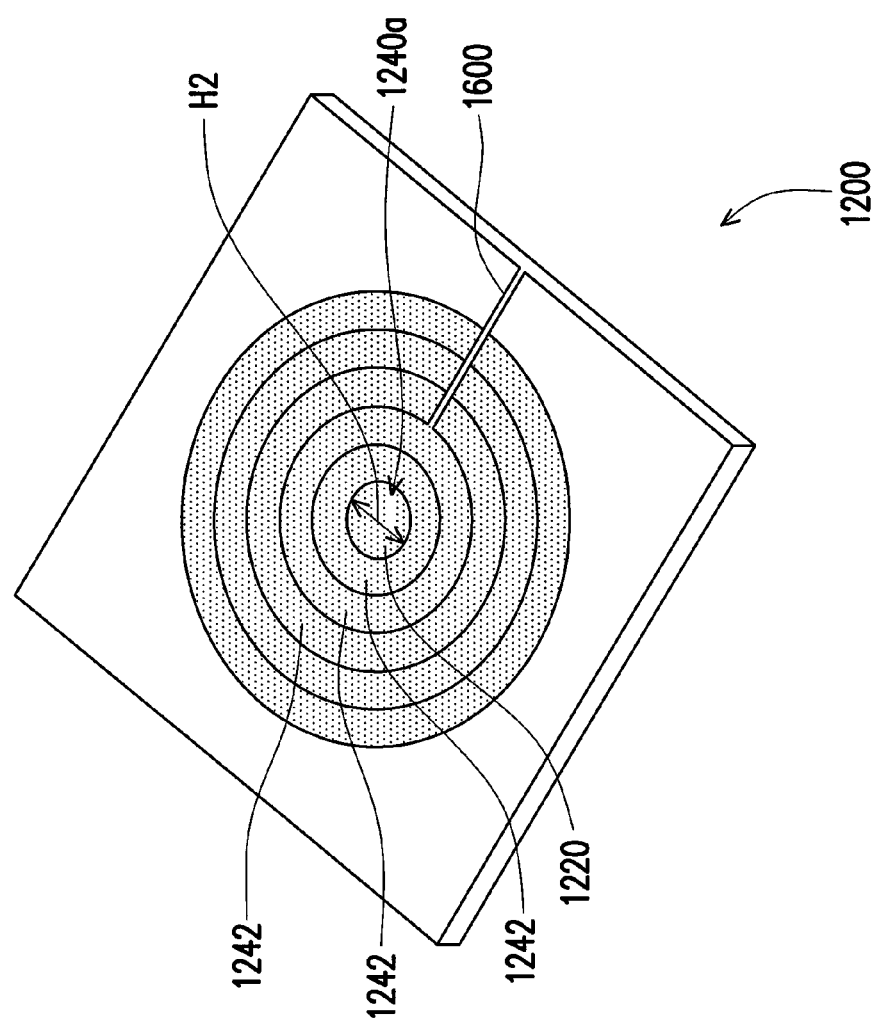

FIG. 1 is a schematic cross-sectional diagram of a liquid crystal optical lens in accordance with an embodiment of the invention. FIGS. 2A and 2B are schematic diagrams respectively illustrating a first device substrate and a second device substrate depicted in FIG. 1. For ease of illustration, FIGS. 2A and 2B mainly depict a portion of an electrode layer and a conductive layer. Other possible film layers are therefore abbreviated. Referring to FIGS. 1, 2A, and 2B, according to the present embodiment, a liquid crystal optical lens 1000 includes a first device substrate 1100, a second device substrate 1200, and a liquid crystal layer 1300.

As shown in FIGS. 1 and 2A, the first device substrate 1100 a first electrode layer 1120 and a plurality of first stacked layers 1140 stacked in sequence. Each of the first stacked layers 1140 respectively has a first opening 1140a exposing the first electrode layer 1120, and each of the first stacked layers 1140 includes a first conductive layer 1142 and a first insulating layer 1144 disposed between the first conductive layer 1142 and the first electrode layer 1120. In the present embodiment of the invention, a width H1 of the first opening 1140a for each of the first stacked layers 1140 increases in a direction away from the first device substrate 1100 (e.g., a y-axis direction depicted in FIG. 1). Moreover, as shown in FIG. 2A, the first opening 1140a of the first stacked layers 1140 is a circular opening, for example. In other embodiments of the invention, other patterns with symmetrical properties can be employed as the shape of the first opening 1140a. The aforementioned circular opening is merely an illustrative example, and therefore the shape of the first opening 1140a should not be construed as limited thereto.

Moreover, in the present embodiment as shown in FIGS. 1 and 2A, besides the circular shape of the first openings 1140a of the first stacked layers 1140, and the width H1 of the first opening 1140a of the first opening 1140a increasing in the direction away from the first device substrate 1100, a line connecting a central point of the first openings 1140a is substantially vertically aligned with respect to the first device substrate 1100. That is, the first stacked layers 1140 are symmetrically stacked with respect to each other on the first device substrate 1100.

In the present embodiment of the invention, a material of the first electrode layer 1120 and the first conductive layer 1142 is, for example, a transparent conductive material. The transparent conductive material is, for example, indium tin oxide, indium zinc oxide, indium tin zinc oxide, hafnium oxide, zinc oxide, aluminum oxide, aluminum tin oxide, aluminum zinc oxide, cadmium tin oxide, cadmium zinc oxide, any other appropriate material, or a combination thereof. Moreover, a material of the first insulating layer 1144 is a transparent insulating material, for example silicon oxide, silicon nitride, silicon oxynitride, silicon carbide, hafnium oxide, aluminum oxide, any other appropriate material, or a combination thereof.

Continuing reference to FIGS. 1 and 2B, the second device substrate 1200 includes a second electrode layer 1220 and a plurality of second stacked layers 1240. In addition, the second device substrate 1200 is arranged opposite to the first device substrate 1100. Each of the second stacked layers 1240 respectively has a second opening 1240a exposing the second electrode layer 1220, and each of the second stacked layers 1240 includes a second conductive layer 1242 and a second insulating layer 1244 disposed between the second conductive layer 1242 and the second electrode layer 1220. In the present embodiment of the invention, a width H2 of the second opening 1240a for each of the second stacked layers 1240 increases in a direction away from the second device substrate 1200 (e.g., a −y-axis direction depicted in FIG. 1).

Similarly, as shown in FIG. 2B, the second opening 1240a of the second stacked layers 1240 can also be a circular opening. In other embodiments of the invention, other patterns with symmetrical properties can be employed as the shape of the second opening 1240a. The aforementioned circular opening is merely an illustrative example, and therefore the shape of the second opening 1240a should not be construed as limited thereto. It should be noted that, generally speaking, the first opening 1140a and the second opening 1240a have the same shape, and the first opening 1140a respectively corresponds to the second opening 1240a so that the entire structure is symmetrical. Moreover, by adopting the aforementioned symmetrical shape in the practical operation of the liquid crystal optical lens 1000 of the present embodiment, a preferable performance is achieved. However, the above-described shape and dispositional method are merely illustrative examples, and therefore the invention is not limited thereto. Adjustments can be made according to a user's requirements.

Similarly, in the present embodiment as shown in FIGS. 1 and 2B, besides the circular shape of the second opening 1240a of the second stacked layers 1240, and the width H2 of the second opening 1240a increasing in the direction away from the second device substrate 1200, a line connecting a central point of the second openings 1240a is substantially vertically aligned with respect to the second device substrate 1200. That is, the second stacked layers 1240 are symmetrically stacked with respect to each other on the second device substrate 1200. Moreover, in the present embodiment of the invention, the second electrode layer 1220 and the second conductive layer 1242 are composed of, for example, the same material as the previously described material of the first electrode layer 1120 and the first conductive layer 1142. In addition, the second insulating layer 1244 is composed of the same material as the first insulating layer 1144. For reference, please refer to the earlier description, and no further depiction is provided hereafter.

Additionally, as shown in FIG. 1, the liquid crystal layer 1300 is disposed between the first device substrate 1100 and the second device substrate 1200, and the liquid crystal layer 1300 is configured in the first opening 1140a and the second opening 1240a. In the present embodiment of the invention, a material of the liquid crystal layer 1300 can be polymer network liquid crystal (PNLC), although the invention is not limited thereto, since this portion of the invention is determined by user design. Moreover, as shown in FIG. 1, 2A or 2B, the above-described first stacked layers 1140 or the second stacked layers 1240 further include a trench 1600. In the present embodiment of the invention, the trench 1600 connects the first opening 1140a or the second opening 1240a so that the material of the aforementioned liquid crystal layer 1300 can be transferred to the first opening 1140a or the second opening 1240a by the trench 1600. The necessity of the above-described trench 1600 is mainly determined by a method in which the liquid crystal layer 1300 is injected between the first device substrate 1100 and the second device substrate 1200 in the liquid crystal optical lens 1000. Typically speaking, the method to inject the liquid crystal layer 1300 can at least be grouped into a vacuum injection method or an one drop filling (ODF) method. However, these methods are only illustrative examples, and the invention is not limited thereto.

In the present embodiment of the invention, as shown in FIG. 1, the liquid crystal optical lens 1000 further includes a first alignment layer 1420 and a second alignment layer 1440. More specifically, the first alignment layer 1420 has a first alignment direction, and the first alignment layer 1420 is disposed on the first device substrate 1100 to cover the first electrode layer 1120 and the first conductive layer 1142 of each of the first stacked layers 1140. Moreover, the second alignment layer 1440 has a second alignment direction, and the second alignment layer 1440 is disposed on the second device substrate 1200 to cover the second electrode layer 1140 and the second conductive layer 1242 of each of the second stacked layers 1240. In the present embodiment of the invention, as shown in FIG. 1, the first alignment direction and the second alignment direction are substantially perpendicular to each other, so that the liquid crystal molecules of the liquid crystal layer 1300 are rotationally aligned in sequence from the first alignment layer 1420 to the second alignment layer 1440 along the y-axis direction. A rotational angle is substantially 90°, as shown in FIG. 1.

Moreover, as shown in FIG. 1, the liquid crystal optical lens 1000 further includes a sealant 1500. In the present embodiment of the invention, the sealant 1500 is disposed between the first alignment layer 1420 and the second alignment layer 1440, so that the first device substrate 1100 is bonded with the second device substrate 1200. Typically speaking, an adhesive is disposed on at least one of the device substrates 1100 or 1200, and the device substrates 1100 and 1200 are aligned and bonded. When the adhesive solidifies, the aforementioned sealant 1500 is formed. In the present embodiment of the invention, the sealant 1500 is formed by a plastic framing technique used for packaging a liquid crystal display (LCD) panel, or other suitable plastic framing techniques and materials. The above description serves only as an illustrative example, and therefore the invention is not limited thereto.

As depicted in the above-described structure, the electrode layers and the conductive layers of the liquid crystal optical lens 1000 in the present embodiment adopt a three-dimensional stacking design, and concurrently, the adopted shape of the conductive layers is a ring shape. Therefore, when applying a suitable voltage to each of the electrodes, a twisting degree of a liquid crystal molecule configured between the first device substrate 1100 and the second device substrate 1200 can be controlled to adjust a refractive index distribution between the first device substrate 1100 and the second device substrate 1200. Consequently, the liquid crystal optical lens 1000 has a light focus/diverge function similar to a convex/concave lens. Specifically, the liquid crystal optical lens 1000 of the present embodiment adopts the aforementioned structure, and by complementing a suitable driving voltage to each of the conductive layers, a gradient-index (GRIN) lens can be formed.

Figure 3A:
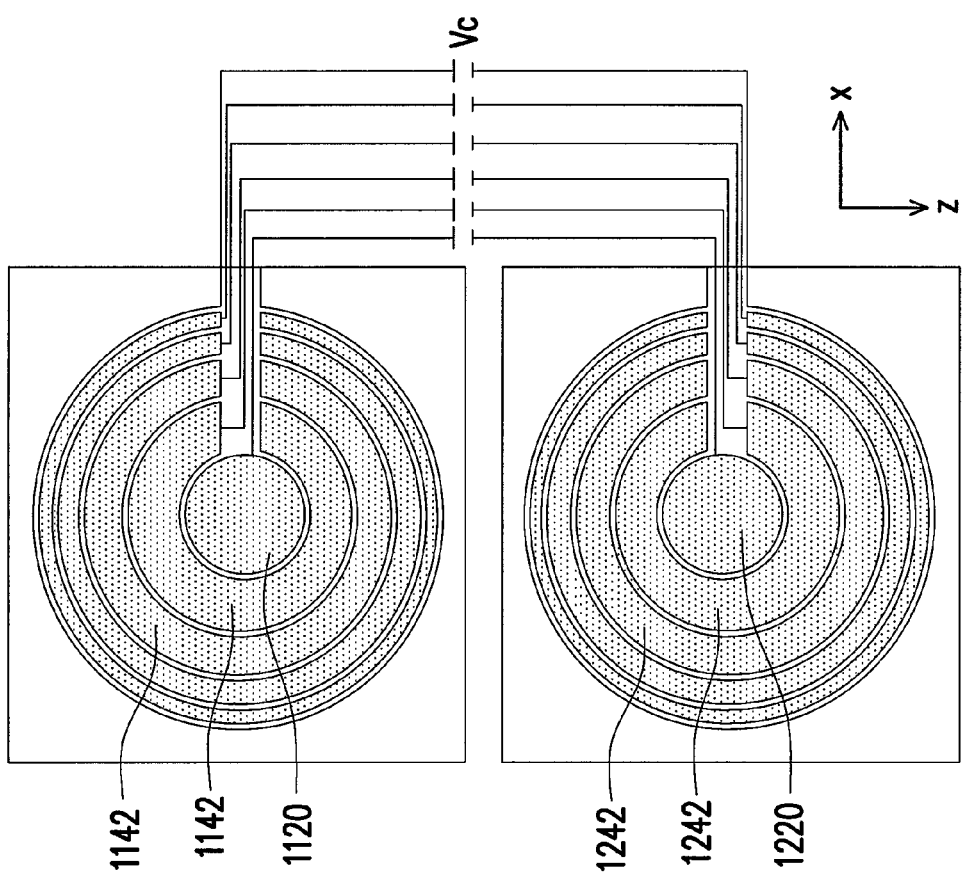
FIG. 3A is a schematic diagram illustrating the first device substrate and the second device substrate sharing a common voltage source.
Figure 3B:
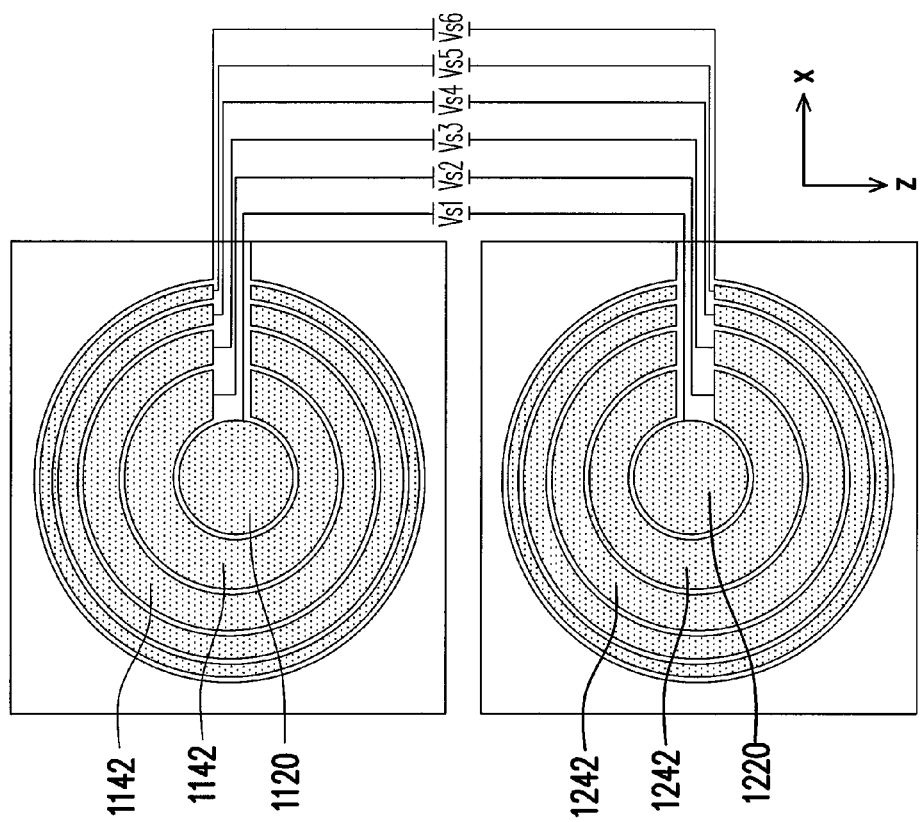
FIG. 3B is a schematic diagram illustrating the first device substrate and the second device substrate sharing a plurality of voltage sources.

In order to further describe the implementation scheme employed on each of the electrode layers and the conductive layers, FIGS. 3A and 3B are referenced for the description. FIG. 3A is a schematic diagram illustrating the first device substrate and the second device substrate sharing a common voltage source. FIG. 3B is a schematic diagram illustrating the first device substrate and the second device substrate sharing a plurality of voltage sources.

First, as shown in FIGS. 1 and 3A, the first electrode layer 1120 and the first conductive layer 1142 of each of the first stacked layers 1140 are electrically connected to a common first potential. On the other hand, the second electrode layer

1220 and the second conductive layer 1242 of each of the second stacked layers 1240 are electrically connected to a common second potential. Here, the first potential is not the same as the second potential. Accordingly, a potential difference applied on the first electrode layer 1120 and the second electrode layer 1220 is substantially equal to a potential difference applied on the first conductive layer 1142 of each of the first stacked layers 1140 and the corresponding second conductive layer 1242 of each of the second stacked layers 1240. In other words, by adopting a design of only a single voltage source Vc and connecting the aforementioned electrode layers and conductive layers in parallel, the previously described GRIN lens is formed.

More specifically, since the potential difference of the first electrode layer 1120 and the second electrode layer 1220 is substantially equal to the potential difference of the first conductive layer 1142 of each of the first stacked layers 1140 and the corresponding second conductive layer 1242 of each of the second stacked layers 1240, and as shown in FIG. 1, a distance between each of the electrode layers and the corresponding conductive layer thereof is not the same, therefore a twisting degree of the liquid crystal molecule disposed between the first device substrate 1100 and the second device substrate 1200 is also not the same. At this time, if a voltage of the voltage source is suitably adjusted, then the aforementioned GRIN lens can be formed, whereby the liquid crystal optical lens 1000 obtains an adjustable light focus/disperse function similar to a convex/concave lens.

Moreover, as shown in FIGS. 1 and 3B, the first electrode layer 1120 and the second electrode layer 1220 are driven by a first driving signal source Vs1, and the first conductive layer 1142 of each of the first stacked layers 1140 and the corresponding second conductive layer 1242 of each of the second stacked layers 1240 are respectively driven by a second driving signal source Vs2-Vs6. Accordingly, a potential difference applied on the first electrode layer 1120 and the second electrode layer 1220 can be unequal to a potential difference applied on the first conductive layer 1142 of each of the first stacked layers 1140 and the corresponding second conductive layer 1242 of each of the second stacked layers 1240. Therefore, by adopting a design of a plurality of voltage sources Vs1-Vs6 each respectively electrically connected to the aforementioned electrode layers and conductive layers, a more flexible adjustment mechanism can be obtained, whereby the above-described GRIN lens is formed. Similarly, by suitably adjusting the voltages of the voltage sources Vs1-Vs6 to form a GRIN lens, the liquid crystal optical lens 1000 can obtain an adjustable light focus/disperse function similar to a convex/concave lens.

A manufacturing method of the aforementioned liquid crystal optical lens 1000 is described hereinafter.

Figure 4F:
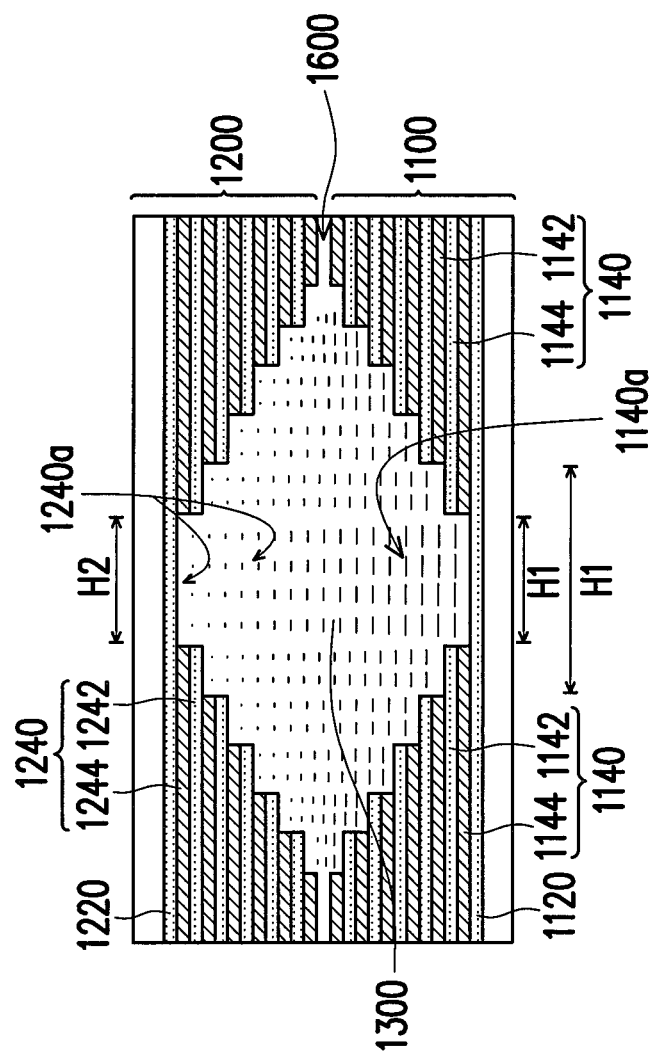

FIGS. 4A-4F are schematic diagrams illustrating a process for manufacturing a liquid crystal optical lens in accordance with an embodiment of the invention. Referring to FIG. 4A, first a first substrate 1100a and a second substrate 1200a are provided. Here, the first substrate 1100a and the second substrate 1200a are transparent substrates such as glass substrates, for example.

Thereafter, as shown in FIG. 4B, the aforementioned first electrode layer 1120 and the second conductive layer 1220 are respectively formed on the first substrate 1100a and the second substrate 1200a. In the present embodiment of the invention, the first conductive layer 1120 and the second conductive layer 1220 may adopt the materials that have been previously described, and thus, detail descriptions are omitted. Moreover, a method of forming the first electrode layer 1120 and the second conductive layer 1220 can be sputtering, metal organic chemical vapor deposition (MOCVD), evaporation, or other suitable fabrication processes.

Thereafter, as shown in FIG. 4C, an insulating material layer P1 and a conductive material layer P2 are formed in sequence on the first electrode layer 1120 and on the second electrode layer 1220. In the present embodiment of the invention, a method of forming the insulating material layer P1 is using chemical vapor deposition, although the invention is not limited thereto. In other embodiments of the invention, other suitable fabrication methods, such as screen printing, coating, inkjet, and energy source processing can be used. Moreover, the insulating material layer P1 may adopt the materials previously described for the aforementioned insulating layers 1144 and 1244, and therefore further description is omitted. The conductive material layer P2 may adopt the previously described materials for the aforementioned first electrode layer 1142 and the second electrode layer 1242.

Thereafter, as shown in FIG. 4D, the insulating material layer P1 and the conductive material layer P2 configured on the first substrate 1100a and the second substrate 1200a are patterned, so as to respectively form the aforementioned first stacked layers having the first insulating layer 1124 and the first conductive layer 1122, as well as the second stacked layers 1220 having the second insulating layer 1224 and the second conductive layer 1222. In the present embodiment of the invention, a method of patterning the insulating material layer P1 and the conductive material layer P2 is, for example, photolithography, dry-etching, wet-etching, or any other suitable fabrication process.

Thereafter, as shown in FIG. 4E, the fabrication processes depicted in FIGS. 4C and 4D are repeatedly performed to respectively stack the above-described first stacked layers 1140 and the second stacked layers 1240 on the first electrode layer 1120 and the second electrode layer 1220. It should be noted that, the first opening 1140a of each of the first stacked layers 1140 increases in a direction away from the first substrate 1100a (e.g., a y-axis direction depicted in FIG. 4E), and the second opening 1240a of each of the second stacked layers 1240 increases in a direction away from the second substrate 1200a (e.g., the y-axis direction depicted in FIG. 4E). Up to this step, the fabrication of the above-described first device substrate 1100 and the second device substrate 1200 is substantially complete.

Thereafter, as shown in FIG. 4F, the first device substrate 1100 and the second device substrate 1200 are assembled, and a liquid crystal molecule is injected between the first device substrate 1100 and the second device substrate 1200 to form the aforementioned liquid crystal layer 1300. In the present embodiment of the invention, a method to form the liquid crystal layer 1300 can be at least the vacuum injection method or the ODF method. When the vacuum injection method is adopted, the aforementioned trench 1600 can be formed on the first stacked layers 1140 or the second stacked layers 1240, so as to connect the first opening 1140a or the second opening 1240a, whereby a liquid crystal material of the liquid crystal layer 1300 can be transferred in the first opening 1140a or the second opening 1240a from the trench 1600. However, only an illustrative example has been described, and the invention is not limited thereto. Moreover, the previously described method for the sealant 1500 can be adopted as a method to assemble the aforementioned first device substrate 1100 and the second device substrate 1200. Therefore, further description is omitted where previous reference can be found.

In one embodiment of the invention, as shown in FIG. 1, the aforementioned first alignment layer 1420 can also be formed on the first device substrate 1100 to cover the first electrode layer 1120 and the first conductive layer 1142 of each of the first stacked layers 1140. Moreover, the aforementioned second alignment layer 1440 can be formed on the second device substrate 1200 to cover the second electrode layer 1220 and the second conductive layer 1242 of each of the second stacked layers 1240. In the present embodiment of the invention, a method of forming the first alignment layer 1420 and the second alignment layer 1440 is, for example, a coating process. Thereafter, an alignment process is performed on the first alignment layer 1420 and the second alignment layer 1440, in order for the first alignment layer 1420 and the second alignment layer 1440 to respectively obtain the aforementioned first alignment direction and the second alignment direction. Up to this step, the manufacturing method of the liquid crystal optical lens depicted in FIG. 1 is substantially complete.

It should be noted that, FIGS. 4A-4F only illustrates a method of manufacturing the liquid crystal optical lens depicted in FIG. 1. Persons having ordinary skill in the art may slightly modify the disclosed manufacturing steps or method to form the liquid crystal optical lens 1000 of the present embodiment (e.g., forming the above-described insulating layer after forming the electrode layers in sequence, and repeatedly performing the step of forming the insulating layer and the conductive layer after forming the aforementioned conductive layer). These modifications are still within the scope of the invention for which protection is sought.

In addition, FIG. 5 is a schematic diagram illustrating a lens apparatus in accordance with another embodiment of the invention. Referring to FIG. 5, a lens apparatus 5000 according to the present embodiment includes a first lens group 5100, a second lens group 5200, and a third lens group 5300. The first lens group 5100 has a positive refractive power, and the first lens group 5100 is formed by a liquid crystal optical lens 5120 and a compensator lens 5140 arranged in sequence from an object side to an image side.

In the present embodiment of the invention, the liquid crystal optical lens 5120 is the aforementioned liquid crystal optical lens 1000, for example. Therefore, an internal refractive index distribution of the liquid crystal optical lens 5120 can be adjusted and controlled by voltages, and thereby a focal length of the liquid crystal optical lens 5120 can be adjusted. Hence, the liquid crystal optical lens 5120 has a focus function. In the present embodiment of the invention, the compensator lens 5140 is a concave-convex lens, for example, although the invention is not limited thereto. The compensator lens 5140 is mainly used to compensate the focal length of the liquid crystal optical lens 5120, so that the lens apparatus 5000 has a preferred focusing quality.

Continuing reference to FIG. 5, the second lens group 5200 has a negative refractive power, and the second lens group 5200 is disposed between the first lens group 5100 and the image side. The third lens group 5300 has a positive refractive power, and the third lens group 5300 is disposed between the second lens group 5200 and the image side. In the present embodiment of the invention, the second lens group 5200 is a zoom lens group, and the second lens group 5200 mainly moves in a plurality of segmented and fixed distances between the first lens group 5100 and the third lens group 5300, so as to achieve a zoom function of the lens apparatus 5000. Moreover, the locations of the first lens group 5100 and the third lens group 5300 are fixed with respect to the lens apparatus 5000. The third lens group 5300 is a compensator lens group, in order to compensate the optical quality of the lens apparatus 5000 during image formation.

In the present embodiment of the invention, since the first lens group 5100 of the lens apparatus 5000 mainly uses the liquid crystal optical lens 5120 to perform the focus function, and the liquid crystal optical lens 5120 can achieve the focus function by a simple voltage control process, consequently the lens apparatus 5000 of the present embodiment can reduce the mechanical structure complexity whereas conventionally, a plurality of lenses combined with a plurality of actuators are needed to achieve the focus function. Moreover, in order to achieve the zoom function of the lens apparatus 5000, the second lens group 5200 mainly moves in segmented and fixed distances between the first lens group 5100 and the third lens group 5300. Therefore, the use of position sensors and close-loop controllers is not required to achieve the zoom function. In addition, energy savings, cost reduction, and further mechanical complexity reduction can be achieved.

Figure 6:
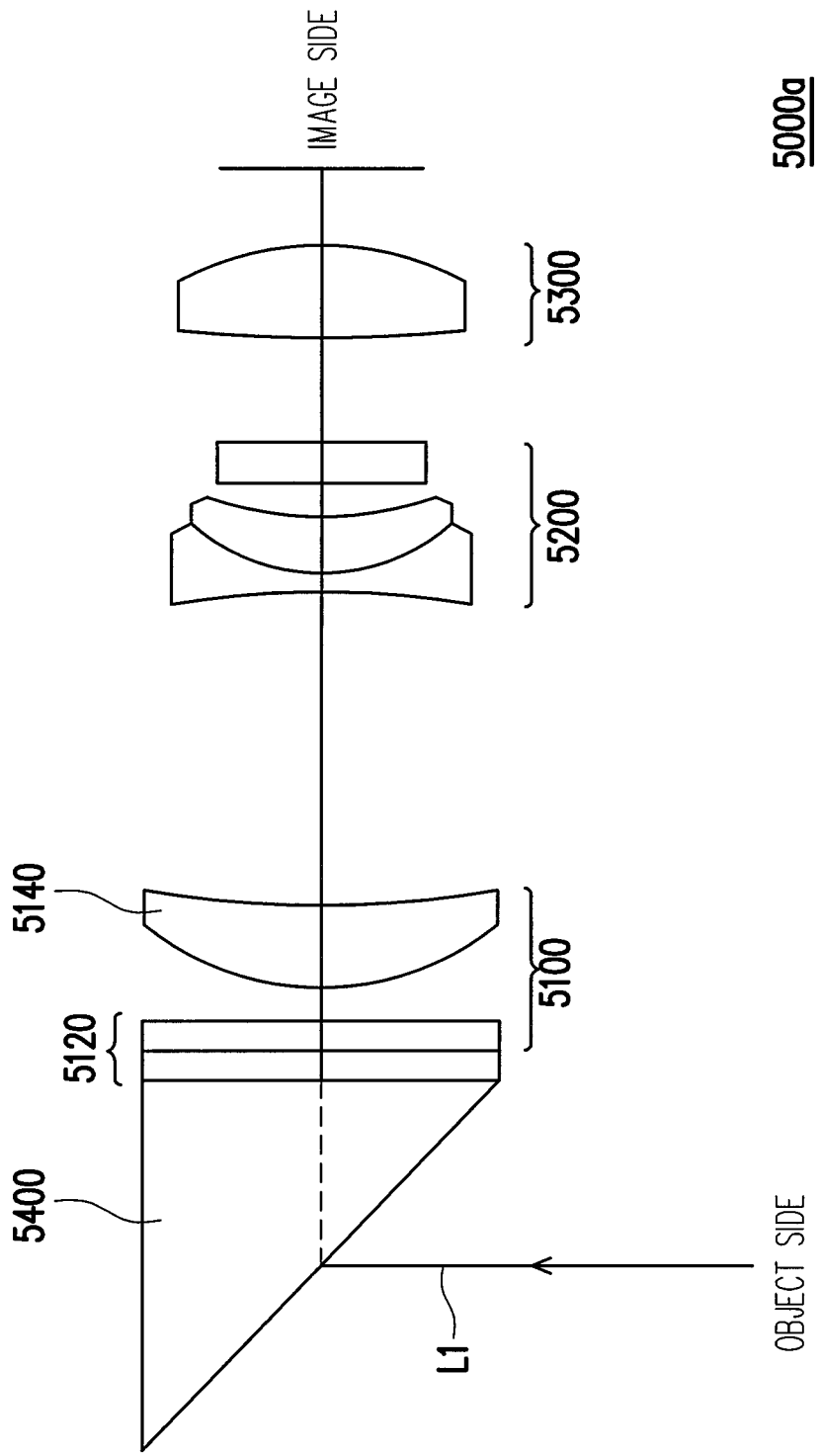
FIG. 6 is a schematic diagram illustrating a lens apparatus in accordance with another embodiment of the invention.

Moreover, the lens apparatus illustrated in FIG. 5 adopts a vertical design. In another embodiment of the invention, by combining the lens apparatus of FIG. 5 with a refractor, a periscopic lens apparatus 5000a as illustrated in FIG. 6 can be formed. FIG. 6 is a schematic diagram illustrating the lens apparatus in accordance with another embodiment of the invention.

Referring to FIGS. 5 and 6 concurrently, the lens apparatus 5000a is similar to the lens apparatus 5000. A difference between the two lies in that the lens apparatus 5000a further includes a refractor 5400, in which the refractor 5400 is disposed between the object side and the first lens group 5100. As shown in FIG. 6, an object light L1 from the object side is refracted by the refractor 5400 and transmitted to the first lens group 5100.

More specifically, due to the refractor 5400 disposed in the lens apparatus 5000a, the object light L1 is deflected and transmitted to the first lens group 5100, and thereafter transmitted in sequence to the image side for image formation. In other words, the lens apparatus 5000a can receive light of other angles. For example, the periscopic lens apparatus 5000a is formed by an object light that is deflected by 90° and then transmitted to the image side for image formation.

Moreover, since the lens apparatus 5000a and the lens apparatus 5000 are similar, therefore the lens apparatus 5000a has the advantages previously mentioned for the above-described lens apparatus 5000. Hence, further description thereof is omitted.

In light of the foregoing, the electrode layers and conductive layers of the liquid crystal optical lens in the invention as embodied herein mainly adopt a three-dimensional stacking design, and concurrently, the adopted shape of the conductive layers is a ring shape. Therefore, when respectively applying a suitable voltage to each of the electrodes, a twisting degree of a liquid crystal molecule configured between the first device substrate and the second device substrate can be controlled. Consequently, a light focus/diverge function similar to a convex/concave lens can be obtained.

In other words, the liquid crystal optical lens in the invention as embodied herein adopts the aforementioned structure, and by complementing a suitable driving voltage to each of the conductive layers, a GRIN lens having a preferred focus function can be formed. Moreover, the invention as embodied herein provides a manufacturing method of the above-described liquid crystal optical lens.

In addition, the lens apparatus in the invention as embodied herein adopts the above-described liquid crystal optical lens. Not only does the lens apparatus have a preferred focus function, but the lens apparatus can also lower the complexity of the entire structure as well as the cost.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A liquid crystal optical lens, comprising:
   a first device substrate comprising a first electrode layer and a plurality of first stacked layers stacked in sequence thereon, wherein each of the first stacked layers has a first opening exposing the first electrode layer, and each of the first stacked layers comprises a first conductive layer and a first insulating layer disposed between the first conductive layer and the first electrode layer;
   a second device substrate comprising a second electrode layer and a plurality of second stacked layers stacked in sequence thereon, and the second device substrate is configured opposed to the first device substrate, wherein each of the second stacked layers has a second opening exposing the second electrode layer, and each of the second stacked layers comprises a second conductive layer and a second insulating layer disposed between the second conductive layer and the second electrode layer; and
   a liquid crystal layer disposed between the first device substrate and the second device substrate and configured in the first opening and the second opening, wherein the liquid crystal layer completely fills the first opening and the second opening between the first electrode layer and the second electrode layer, wherein the first device substrate and the second device substrate are opposite and symmetrical to each other.

2. The liquid crystal optical lens as claimed in claim 1, wherein a width of the first opening of each of the first stacked layers increases in a direction away from the first device substrate, and a width of the second opening of each of the second stacked layers increases in a direction away from the second device substrate.

3. The liquid crystal optical lens as claimed in claim 2, wherein the first alignment direction is substantially perpendicular to the second alignment direction.

4. The liquid crystal optical lens as claimed in claim 2, further comprising a sealant disposed between the first alignment layer and the second alignment layer, so as to seal the first device substrate with the second device substrate.

5. The liquid crystal optical lens as claimed in claim 1, wherein the first openings of the first stacked layers respectively correspond to the second openings of the second stacked layers.

6. The liquid crystal optical lens as claimed in claim 1, wherein the first openings of the first stacked layers and the second openings of the second stacked layers are a circular opening.

7. The liquid crystal optical lens as claimed in claim 1, further comprising:
   a first alignment layer having a first alignment direction, and the first alignment layer is disposed on the first device substrate to cover the first electrode layer and the first conductive layer of each of the first stacked layers; and
   a second alignment layer having a second alignment direction, and the second alignment layer is disposed on the second device substrate to cover the second electrode layer and the second conductive layer of each of the second stacked layers.

8. The liquid crystal optical lens as claimed in claim 1, wherein the first electrode layer and the first conductive layer of each of the first stacked layers are electrically connected to a first potential, and the second electrode layer and the second conductive layer of each of the second stacked layers are electrically connected to a second potential, wherein the first potential and the second potential are different.

9. The liquid crystal optical lens as claimed in claim 1, wherein the first electrode layer and the second electrode layer are driven by a first driving signal source, and the first conductive layer of each of the first stacked layers and the second conductive layer of each of the second stacked layers corresponding thereto are driven by a second driving signal source.

10. The liquid crystal optical lens as claimed in claim 1, wherein a material of the liquid crystal layer comprises polymer network liquid crystal (PNLC).

11. The liquid crystal optical lens as claimed in claim 1, wherein the first stacked layers or the second stacked layers further include a trench connecting the first opening or the second opening, so as to transfer the material of the liquid crystal layer to the first opening or the second opening by the trench.

12. The liquid crystal optical lens as claimed in claim 1, wherein a material of the first electrode layer, the first conductive layers, the second electrode layer, and the second conductive layers comprises a transparent conductive material.

* * * * *